Nov. 7, 1933.   A. A. DEVINCENZI   1,933,718
FLEXIBLE VISE
Filed April 19, 1932

INVENTOR.
ALBERT A. DEVINCENZI
BY
ATTORNEY

Patented Nov. 7, 1933

1,933,718

UNITED STATES PATENT OFFICE 1,933,718

FLEXIBLE VISE

Albert A. Devincenzi, San Francisco, Calif.

Application April 19, 1932. Serial No. 606,153

3 Claims. (Cl. 113—104)

This invention relates to a flexible vise, and more particularly, but not necessarily, to a vise for use in mechanical dentistry.

The conventional soldering block which is generally used in mechanical dentistry for supporting crowns, inlays, plates, bridges and the like, or any type of gold work, is undesirable, due to its inability to properly support firmly an article on which work is being done, or for changing the position of such article.

The present device is particularly valuable in the holding of crowns, inlays, bridges or any type of gold work upon which gold soldering must be done, and it is especially adapted to hold the gold work in a firm position, so that any teasing of the gold solder, and then spreading the same over a wall, also the article on which the work is being done, is supported by the device, the latter being particularly adapted to move or place the article in different positions without chilling, allowing it to cool, readjusting or replacing the article.

In mechanical dentistry, as well as allied arts, it is frequently necessary to perform delicate operations on delicate articles, such as crowns, bridges, porcelain caps, inlays, and so forth, particularly in carrying out the process of teasing and fluxing, often times the elements on which the work is being done is very fragile, and a device is desired that will grasp the element and support it with a minimum grip. Also the operator frequently desires to change the position of an element at times when both his hands are employed, such as with a torch in one hand, and tweezers carrying gold solder to place, or a teasing tine, in the other. Such a change can be readily effected by the present device by pressing on its handle with any free part of the operator's hand or elbow, and moving the device in its flexible mounting to the desired position. Further, the present device may be readily operated by its handle to place the element in the desired position in a quick and efficient manner. The conventional soldering block or tweezers generally employed in mechanical dentistry do not provide facilities for holding an element in every position that may be desired, without the use of either hand, mouth or any part of the body; often times it being necessary to prop the element in different positions by means of one or more props, and when this is done, the exact position desired is seldom obtained, and even if obtained, the element is easily moved in teasing the solder.

It is one object of this invention to provide a device for holding the article, such as a bridge or crown, that will operate to change the position of such article with a minimum effort and adapted to place the article in any desired position.

Another object is to provide a device having the above characteristics, that shall operate substantially as a third hand, by flexibly grasping a delicate article, and adjustably holding such article in the desired position.

Another object is to provide a holding device having a flexible grasping element that may be adjusted to provide the desired grip upon an article, and to adjustably place such article in the desired position.

A further object of the invention is to provide a flexible holding device adapted for universal movement, whereby the position of an element supported by the device may be quickly and easily changed without removing such element from the device.

The above and other objects will be apparent throughout the further description of the invention, when taken in connection with the accompanying drawing, wherein like reference characters refer to like parts. It is to be distinctly understood that the drawing is not a definition of the invention, this being defined by the appended claims.

In the drawing:—

Figure 1:
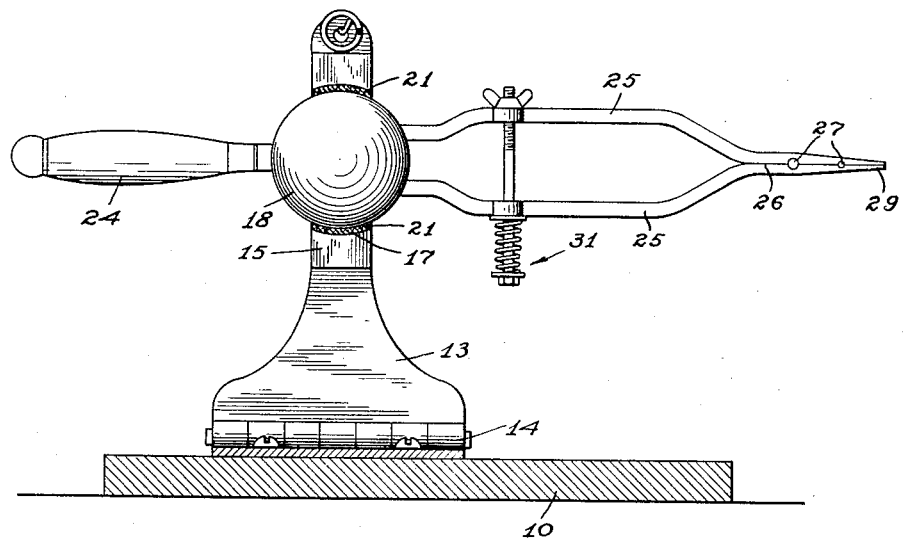
Fig. 1 is a longitudinal view, taken on line 1—1 of Fig. 2.
Figure 2:
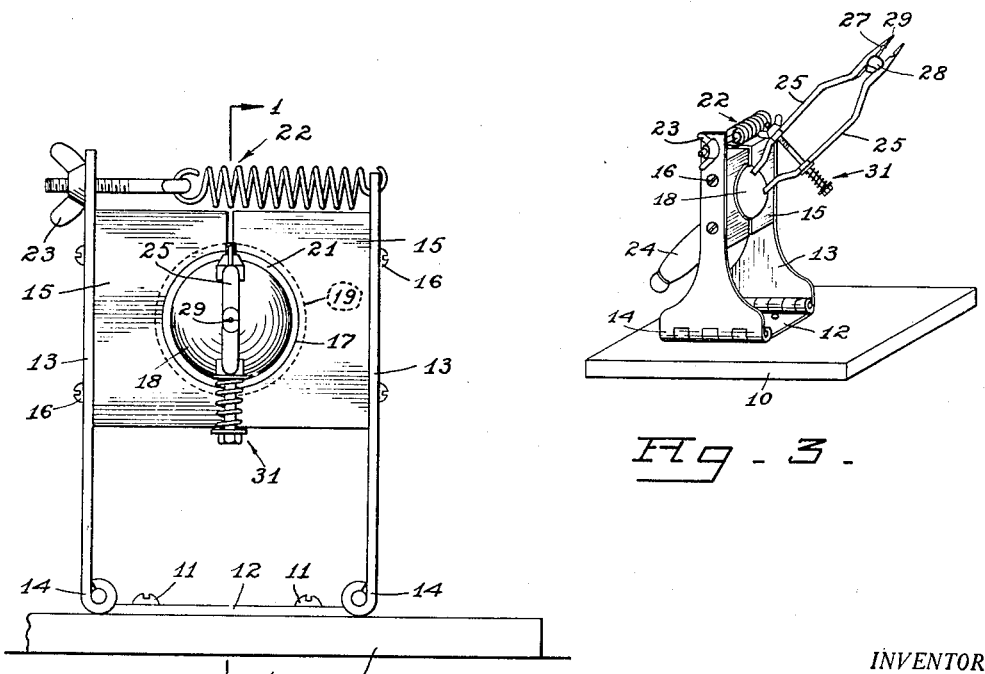
Fig. 2 is a front elevation of a device embodying the invention.

In the form shown, a base 10 is provided upon which the device is supported. This base is of sufficient weight and size to properly balance the device. Supported by the base and fixed thereto by means of screws or nails 11 is provided a horizontal member 12 having a vertical supporting member 13 hingedly connected to each of its ends, as shown at 14. The members 13 are each provided with a supporting block 15 which is fixed to their inner faces by means of screws or nails 16. Each of the blocks 15 provide a semicircular groove or cutaway portion 17, these semicircular grooves being opposed one to the other and forming a circular opening for receiving and turnably supporting a sphere 18. The cooperating surfaces of the grooves 17 are concaved, as shown at 19, for properly engaging the surface of the sphere 18, to permit universal swivel of the sphere.

In the preferred embodiment of the device, a frictional strip or band 21 is provided between the concave surfaces of the grooves 17 and the sphere 18 for frictionally holding the sphere in position.

A resilient clamp 22 is provided at the upper ends of the supports 13 for effecting the desired clamping tension on the sphere 18. The resilient clamp 22 is adjustable, and means for effecting the adjustment may be a threaded bar 23, as shown. It can be seen, therefore, that upon actuating the wing nut of the threaded means 23, that the tension of the members 15 upon the sphere 18 may be adjusted as desired. Mounted on and universally movable with sphere 18 is a tweezer device or means for holding a workpiece, and as exemplified herein, there is provided an actuating handle 24 on one side of the sphere for manually universally actuating the sphere 18, and on the opposite side of the sphere there is provided a pair of resilient jaws forming a vise or holding device, which consists of a pair of resilient or spring members 25 having their inner ends rigidly fixed in spaced relation to the sphere 18. If desired, the tweezers may be of usual type, formed of cross pieces pivotally connected so that the jaws may be manually operated from the handle. The members 25 may be formed of arcuate shape, as shown, and positioned to oppose one another, having their outer ends biased into gripping contact, one with the other.

Figure 3:
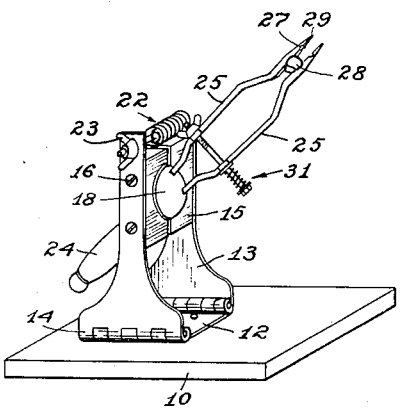
Fig. 3 is a perspective view of one form of a device embodying the invention.

It is desired that a portion of the opposing sides of the members 25, adjacent their outer ends, be provided with cooperating flat surfaces, as shown at 26, the surface 26 being provided with cooperating semi-circular grooves 27 adapted to register one with the other, for the purpose of receiving and holding an article, such as a bridge, as shown at 28, in Fig. 3.

In the preferred form of the device, the outer ends of the member 25 are tapered and terminate in a point, as shown at 29, which point is especially adaptable for engaging and supporting small elements on which work is to be done.

Means 31 are also provided for adjusting the gripping action of the members 25, which means may consist of a thread actuated spring, as shown. It is to be specifically understood that the adjusting means 31 and 22 herein shown may be substituted by any suitable means that will accomplish the desired results.

The present invention is very simple in structure and provides a much needed device which can be manufactured cheaply. It is durable, efficient in operation and because of its adjustable features, it is especially desirable in the art of mechanical dentistry, as well as allied arts.

While only one embodiment of the invention has been illustrated and described, it will be obvious to those skilled in the art that certain changes, substitutions, additions and omissions may be made in the structure without departing from the spirit and scope of the invention and defined by the appended claims.

I claim:—

1. A holding device comprising a supporting base, a pair of supporting members hingedly connected to said base, a supporting block carried by each of said hinged members, said supporting blocks presenting concaved semi-circular bearing faces, said faces being diametrically oppositely disposed one from the other, a substantially hemispherical universal member mounted in said bearing faces, resilient means carried by the top of said hinged members and adapted to adjustably clamp said faces in contact relative with said hemispherical member.

2. A claim in accordance with claim 1, wherein a frictional band is provided between the concave faces of said bearing surfaces and the cooperating surface of said hemispherical member.

3. A holding device comprising a base, a member projecting upwardly from said base and supported by said base, a substantially circular opening in said member presenting a concave surface for providing a seat, a spherical member mounted in said opening and adapted to be universally supported within said seat, work-holding jaws fixed to said spherical member, and a handle fixed to said spherical member and disposed on the opposite side of said spherical member from said work-holding jaws, the longitudinal axis of said work-holding jaws and said handle member lying in substantially the intersection of a pair of plains disposed at right angles one to the other.

ALBERT A. DEVINCENZI.